US008880636B2

(12) United States Patent
Westberg et al.

(10) Patent No.: US 8,880,636 B2
(45) Date of Patent: Nov. 4, 2014

(54) CACHING IN MOBILE NETWORKS (75) Inventors: Lars Westberg, Enkoping (SE); Ake Arvidsson, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 226 days.

(21) Appl. No.: 13/637,344

(22) PCT Filed: Mar. 25, 2010

(86) PCT No.: PCT/EP2010/053899
§ 371 (c)(1),
(2), (4) Date: Sep. 25, 2012

(87) PCT Pub. No.: WO2011/116819
PCT Pub. Date: Sep. 29, 2011

(65) Prior Publication Data
US 2013/0013726 A1    Jan. 10, 2013

(51) Int. Cl.
G06F 15/16 (2006.01)
G06F 15/173 (2006.01)
H04L 29/08 (2006.01)

(52) U.S. Cl.
CPC ......... *H04L 67/2847* (2013.01); *H04L 67/1002* (2013.01); *H04L 67/2852* (2013.01); *H04L 67/288* (2013.01); *H04L 67/2819* (2013.01)
USPC ........... 709/213; 709/245; 709/223; 709/203; 709/208; 709/227; 709/228; 709/229; 709/225; 709/226; 717/177; 717/174

(58) Field of Classification Search
CPC ............ H04L 64/2842; H04L 67/1095; H04L 67/1002; H04L 67/2862; H04L 67/2847

USPC .......................... 709/203, 208, 245, 225–229
See application file for complete search history.

(56) References Cited

U.S. PATENT DOCUMENTS

| | | | | |
|---|---|---|---|---|
| 7,797,275 | B2 * | 9/2010 | Lee et al. | 707/618 |
| 2001/0054087 | A1 * | 12/2001 | Flom et al. | 709/218 |
| 2003/0115421 | A1 | 6/2003 | McHenry et al. | |
| 2004/0103437 | A1 | 5/2004 | Allegrezza et al. | |
| 2004/0260769 | A1 | 12/2004 | Yamamoto | |
| 2007/0050491 | A1 * | 3/2007 | Kataoka et al. | 709/223 |
| 2009/0291696 | A1 | 11/2009 | Cortes et al. | |
| 2010/0106681 | A1 * | 4/2010 | Povzner et al. | 707/608 |

FOREIGN PATENT DOCUMENTS

EP    2 053 831 A1    4/2009

* cited by examiner

*Primary Examiner* — Jude Jean Gilles
(74) *Attorney, Agent, or Firm* — Rothwell, Figg, Ernst & Manbeck, P.C.

(57) ABSTRACT

A method for optimising the distribution of data objects between caches in a cache domain of a resource limited network. User requests for data objects are received at caches in the cache domain. A notification is sent from each cache at which a request received to a cache manager. The notification reports the user request and identifies the requested data object. At the cache manager, object information including the request frequency of each requested data object and the locations of the caches at which the requests were received are collated and stored, and objects for distribution within the cache domain are identified on the basis of the object information. Instructions are sent from the cache manager to the caches to distribute data objects stored in those caches between themselves. The data objects are distributed between the caches using transmission capacity of the network that would otherwise be unused.

29 Claims, 5 Drawing Sheets

CACHING IN MOBILE NETWORKS

CROSS REFERENCE TO RELATED APPLICATION(S)

This application is a 35 U.S.C. §371 National Phase Entry Application from PCT/EP2010/053899, filed Mar. 25, 2010, designating the United States, the disclosure of which is incorporated herein in its entirety by reference.

TECHNICAL FIELD

The present invention relates to a system for caching data in mobile packet data networks. In particular, the invention relates to a caching architecture suitable for optimising the distribution of cached data in a resource limited network.

BACKGROUND

Typical file caching methods include a cache receiving a file from a file server, and storing the entire file. Later when a client desires the file, instead of serving the file from the file server, the file is served from the cache. Because the cache is typically a server that is closer to the client, or has higher bandwidth than the file server, the file is served to the client quickly from the cache.

Figure 1:
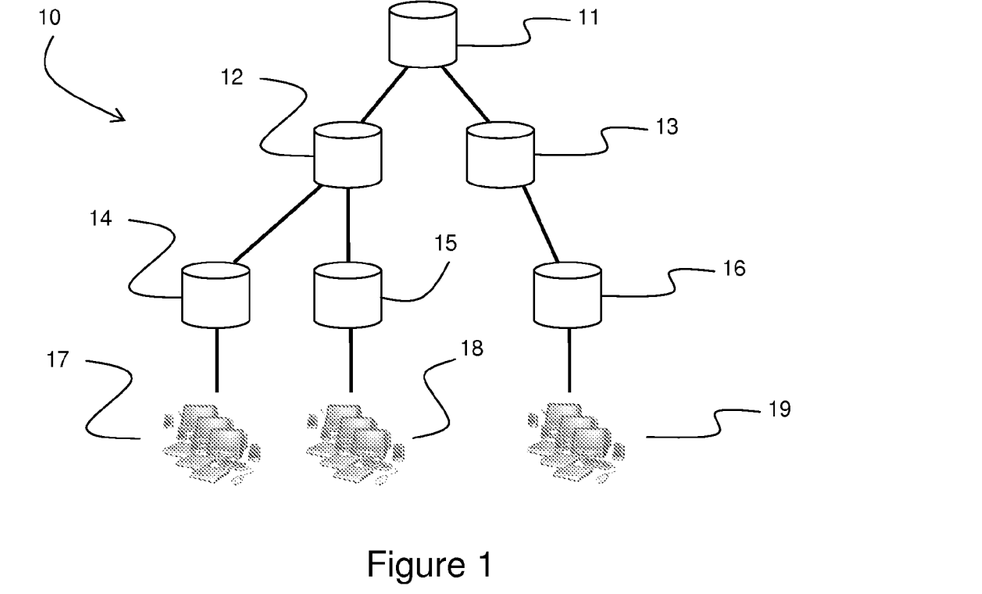
FIG. 1 is a schematic illustration of a network having an origin server and a number of caches.

This can be understood with reference to FIG. 1, which is a schematic illustration of an exemplary architecture of a network 10 having an origin server 11 and a number of caches 12-16. Clients 17-19 are configured to receive files and/or streaming data from the origin server 11 or the caches 12-16.

In order to reduce the load on the origin server 11 and to save bandwidth in the delivery network 10, some of the content is stored in caches 12-16 closer to the end users 17-19. It is desirable to push these caches as close to the end user as possible.

For example, mobile network architectures generally comprise a Core Network (CN), to which are attached a number of radio access networks (RANs) in which terminals are connected to radio base stations (RBSs). The terminals may move and as they move they may be connected wirelessly to different RBSs. The transmission links between the RBSs and the rest of the network are usually rented and limited in capacity. One way of reducing the demands on these links is to use caching and, as described above, caching should preferably take place as close to the terminals as possible to minimize the need for transmission.

One problem with caching in the RAN (with the cache being a part of the RBS or other cell node) is that each cache will receive traffic from only a small population of terminals. In general, the content stored by a cache will be the content which has been requested by the end-users. If the population using the cache is small, the volume of cached content stored in that cache is small. Statistically, the probability that someone else wants to download the same content from that cache, i.e. the "cache hit rate", decreases with a smaller population. One large cache for a large population is therefore statistically more efficient than many small caches serving different smaller subsets of the population.

SUMMARY

It is an object of the present invention to obviate at least some of the above disadvantages. In general, it is desirable to generate a large, virtual cache out of many small ones to solve the problem above. However, the transmission is limited in terms of capacity and must be efficiently used and therefore a distributed cache architecture must consider that limitation.

In accordance with one aspect of the present invention there is provided a network element configured to act as a cache for sending cached data in a session to a mobile terminal in a packet data network. The network element is associated with a cache storage unit for storing data objects. The network element comprises a communications system for communication with other elements in the network. A DPI or proxy agent is configured to inspect packets from the terminal passing through the network element to determine if they include a request for a data object, determine whether the requested data object is stored in the cache storage unit and, if so, send the requested data object towards the terminal. An object agent is configured to receive instructions from a cache manager controlling caches in a cache domain of the network, and in response to send data objects to other caches in the cache domain using transmission capacity that would otherwise remain unused.

The object agent may also be configured to receive data objects not requested by the mobile terminal from other caches in the cache domain, and to store the received data objects in the cache storage unit. This may again use transmission capacity that would otherwise remain unused, and may be in response to instructions from the cache manager to other caches in the cache domain.

The object agent may be configured to capture each event of a request for a particular data object, and pass this information to the cache manager to assist in identifying which data objects should be distributed between caches.

In other words, requested data objects may be distributed between caches in a cache domain, under the control of a cache manager, only when there is available capacity in the network, so that the sending and/or receiving does not interfere with transmission of higher priority data transmission, e.g. requests of data objects from clients or non-cached data objects.

The DPI or proxy agent may be configured so that, if the requested data object is not stored in the cache storage unit, the request is passed towards an upstream network element or the cache manager. When the requested data object passes through the network element when it is returned towards the terminal, it may be saved in the cache storage unit. The network element may be a Radio Base Station.

The object agent may be configured to use transmission capacity that would otherwise remain unused by sending data objects (optionally, only low priority data objects) to the other caches during off-peak data traffic periods. The object agent may also be configured so that high priority objects may still be sent to other caches during peak periods in response to instructions from the cache manager. This means that high priority data objects can still be cached in other caches even during peak periods. High priority objects may be those requested by another mobile terminal through another cache.

The object agent may be configured to capture each event of a request for a particular data object, and pass this information to the cache manager to assist in identifying which data objects should be distributed between caches.

The cache storage unit may be included in the network element.

In accordance with another aspect of the present invention there is provided a cache manager for controlling the distribution of content stored in a set of caches called a cache domain of a packet data network (optionally a resource-limited network). The cache manager comprises an object monitor for receiving notifications from caches in the cache domain about data objects requested at those caches. An object database is configured to collate and store object information about the requested data objects, the object information including information about the caches at which the data objects have been requested and frequency with which the requests have been made. An object distributor is configured to identify objects for distribution on the basis of the object information and instruct the caches in the network to distribute data objects stored in those caches between themselves using transmission capacity of the network that would otherwise be unused. It will be appreciated that the network may include one or more cache domains.

The cache manager may be configured to control the distribution of the data objects between caches in the cache domain so that the cache domain functions as a virtually large cache. The cache domain may correspond to a radio access network in the mobile network. The object distributor may be configured to instruct the caches in the cache domain to distribute high priority objects between themselves during peak periods.

The cache manager may be a discrete entity and include a communications system for communicating with elements in the network. It may be associated with one of the caches in the cache domain. Alternatively, the functionality of the cache manager may be distributed between network elements in the cache domain.

The cache manager may further comprise a topology monitor for retrieving topology information about the topology of the cache domain. A topology database for storing said topology information may also be provided. The object distributor may be configured to make use of the topology information in the determination of how the objects should be distributed between the caches. In more detail, the object distributor may decide which objects should be stored at which caches, and when and from where a necessary fetch should occur (i.e. suitable times and places to distribute content from one or more local caches to one or more other local caches).

The topology information may include data relating to one or more of the following: a topology structure of the cache domain; bandwidth limitations of links between elements in the topology structure; location of caches in the topology structure; current loads sustained by the links between elements in the topology structure; and transport types for data within the cache domain.

In accordance with another aspect of the present invention there is provided a method for optimising the distribution of data objects between caches in a cache domain of a resource limited network. User requests for data objects are received at caches in the cache domain. A notification is sent from the cache at which a request is received to a cache manager. The notification reports the user request and identifies the requested data object. At the cache manager, object information including the request frequency of each requested data object and the locations of the caches at which the requests were received is collated and stored. At the cache manager, objects for distribution within the cache domain are identified on the basis of the object information. Instructions are sent from the cache manager to the caches to distribute data objects stored in those caches between themselves. The data objects are distributed between the caches using transmission capacity of the network that would otherwise be unused.

The functionality of the cache manager may be distributed between network elements in the cache domain. The cache manager may take into account the topology of the network and/or the priority of the requested data objects and/or the frequency of requests for particular data objects when identifying the data objects for distribution.

The network may be a mobile network, and the caches may be associated with or part of RBSs.

The data objects may be distributed between caches during off-peak periods. The method may also comprise labelling a data object as a high priority data object if it is not stored in the cache at which the user request for that data objects is received, and sending instructions, from the cache manager to a cache at which the high priority data object is stored, to send the high priority data object to the cache at which the user request was received during a peak period.

In accordance with a further aspect of the present invention there is provided a computer program product comprising code adapted to be executed on a network element associated with a cache storage unit in a resource limited network. The code is operable to cause the network element to inspect packets, from a terminal in the network, passing through the network element. The code is further operable to cause the network element to determine if said packets include a request for a data object. The code is further operable to cause the network element to determine whether the requested data object is stored in the cache storage unit and, if so, send the requested object towards the terminal. The code is further operable to cause the network element to receive instructions from a cache manager controlling caches in a cache domain of the network to send data objects to other caches in the cache domain using transmission capacity that would otherwise remain unused. The code is further operable to cause the network element to send the data objects in accordance with the received instructions. The code may also be operable to report request statistics to cache managers and to receive and store (and possibly delete) objects as decided by the cache manager.

In accordance with a further aspect of the present invention there is provided a computer program product comprising code adapted to be executed on a cache manager in a resource limited network. The code is operable to cause the cache manager to retrieve notifications from caches in a cache domain controlled by the cache manager, the notifications including details of data objects recently requested at those caches. The code is further operable to cause the cache manager to collate and store object information about the requested data objects, the object information including the location and popularity of requested data objects. The code is further operable to cause the cache manager to identify objects for distribution on the basis of the object information. The code is further operable to cause the network element to instruct the caches in the network to distribute data objects stored in those caches between themselves using transmission capacity of the network that would otherwise be unused.

The invention also provides a computer program product as described above carried on a carrier medium.

BRIEF DESCRIPTION OF THE DRAWINGS

Some preferred embodiments will now be described by way of example only and with reference to the accompanying drawings, in which.

DETAILED DESCRIPTION

As discussed in the background above, when designing a caching system, there is typically a choice between a centrally placed cache or locally placed caches. In both cases there is little gain in transmission, either because the placement is high up in the network (in the case of the centrally placed cache) or because the hit rate becomes too low (in the case of local caches).

It is therefore desirable to combine the hit rate of a central cache with the transmission advantages of local caches. This can be achieved by the use of a "cache manager" which ensures that local caches enjoy a hit rate close or equal to that of a central cache. It does so by pre-loading the local caches according to global statistics (hence the high hit rate) and ensures that this preloading takes place at off-peak times (so as not to violate the bandwidth savings).

Effectively, therefore, a large, virtual cache is generated out of many small ones, in which the limitations of the transmission are taken into consideration. This can be achieved by "cache equalization" which distributes content between the caches. Each small cache stores content requested by a large population (detected and cached by the other small caches) and this increases the local hit rate for popular content. The object data distribution between the small caches can be seen as a form of predictive caching, where the predictions are based on the behaviour of users receiving data through other caches.

The price to be paid is that the volume of data transferred between the caches will increase. If the bandwidth is restricted between the caches, the additionally transferred data will increase the load loads and eventually cause congestion. Methods that can help to solve content distribution in a resource limited network are thus of importance.

Traffic varies over a typical 24 hour period and there is usually a significant amount of free capacity during night hours. Furthermore, even at peak hours there are periods during which free capacity is available. It is thus possible to distribute low volumes of high priority data objects during peak hours (e.g. during the day) and larger volumes of less critical data objects during off-peak hours (e.g., at night). In this context, a data object will be understood as meaning any set of data requested by a terminal and/or stored by a cache.

Figure 2:
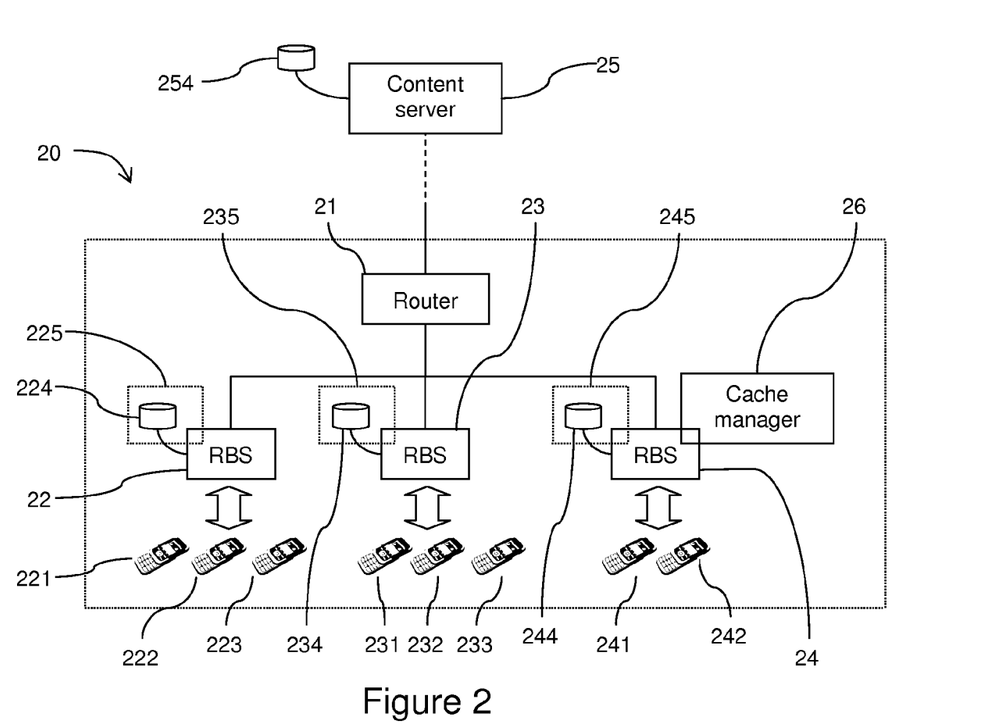
FIG. 2 is a schematic illustration of a Radio Access Network with Radio Base Stations configured to act as caching servers.

FIG. 2 is a schematic illustration of a RAN 20 comprising a router 21 connected to three RBSs 22, 23, 24, each connected to terminals 221, 222, 223; 231, 232, 233; 241, 242. Each RBS 22, 23, 24 is associated with a cache storage unit 224, 234, 244 which may or may not be built into the RBSs themselves. The RBSs 22, 23, 24 and router 21 are interconnected by transmission links. Each RBS is enabled to act as a cache server—i.e. it includes a logical entity that acts like an embedded proxy or uses deep packet inspection (DPI) to detect and direct end-user requests such as HTTP-GET. For convenience, the combination of the caching functionality in a cache server (e.g. RBS 22) and cache storage unit (e.g. 224) will be referred to as a "cache" in this document. This applies whether or not the cache storage unit is physically built in to the cache server. This means that there is effectively a cache 225, 235, 245 associated with each RBS 22, 23, 24.

Although FIG. 2 shows a tree-topology with caches 225, 235, 245 operated by RBSs 22, 23, 24, it will be appreciated that this is an example only. As will become apparent, the mechanisms for distributed cached data described herein may apply to many other topologies and scenarios where there is limited bandwidth between distributed caches 225, 235, 245. The major reason for distributing the caches in this way is that they can provide a (significant) transmission gain from the first hop (between the router 21 and RBSs 22, 23, 24 in FIG. 2).

As indicated above, the problem with such caches is related to the fact that, since each RBS 22, 23, 24 only supplies data to a few terminals 221, 222, 223; 231, 232, 233; 241, 242, the amount of traffic from each RBS 22, 23, 24 is small. The "hit-rate" from local cache traffic is small. The solution is to increase the hit rate by distributing content that is locally cached by any of the small caches 225, 235, 245 in the group to other small caches in that group. The caches in the group will then contain content requested at other caches and this will increase the hit rate.

Thus if content is requested by one of the terminals 222, this request passes through the RBS 22 to which the terminal 222 is connected. Content data is delivered from a content server 25 (associated with a content storage unit 254) upstream in the network (for example in a core network, not shown) through the RBS 22 to the terminal 222. As well as delivering the content data to the terminal 222, the RBS 22 saves the content data in its associated cache storage unit 224. Then the next time the terminal 222 (or any of the other terminals 221, 223 attached to that RBS 22) requests that content, it can be extracted from the cache storage unit 224 by the RBS 22 and supplied to the terminal 222. In addition, the content data is copied to the other RBSs 23, 24 in the RAN 20 and saved in their associated cache storage units 234, 244 so that it can also be supplied, if requested, to any of the other terminals 231, 232, 233; 241, 242 in the RAN.

The problem with the distribution is that the links are limited in bandwidth, such that updates can cause congestion, in particular if they take place during busy hours. Therefore, the updates should be controlled so as to optimise the use of the bandwidth. This optimisation may include some or all of the following:

The use of otherwise unutilised transmission capacity (e.g. during off-peak times).

Potentially popular data is prioritised. For example, data objects for distribution can be queued and served as bandwidth becomes available and according to a queuing discipline based on data object popularity.

The distribution of rarely used data objects is restricted in cases where storage capacity is a limiting factor. Some data may not be distributed. If required, it can be extracted from the cache in which it has been saved.

Furthermore, it may be that a request is made via an RBS 22 for a data object not stored in the cache 225 associated with that RBS, but which is stored in a nearby cache 235, 245. In this situation the data object may be marked as high priority and fetched from the nearby RBS 235, 245 immediately, rather than waiting for bandwidth to become available.

In order to control the distribution of data between the caches 225, 235, 245, a centralised cache manager unit 26 is operatively attached to one of the nodes in the RAN 20. In FIG. 2, it is shown as being associated with one of the RBSs 24, but it will be appreciated that it could also be associated with any of the RBSs 22, 23, 24 or any other network element such as the router 21, for example. The cache manager unit 26 controls the spreading of information among a set of distributed caches. It will be appreciated that it is also possible to devise distributed cache manager solutions which provide the same functionality. The important feature is that the cache manager (whether it is a single unit 26 as shown in FIG. 2 or a distributed system) is able to optimise the distribution of data between caches 225, 235, 245.

The set of caches controlled by a particular manager may be considered as a "caching domain" (CD). CDs may be mutually exclusive or overlapping. The manager will be placed at or associated with a site with a central position in the topology of its domain, and it may be part of an RBS (or any other cache entity) at that site. It will be appreciated that, in the example shown in FIG. 2, distribution of cached data is described as being shared between RBSs 22, 23, 24 of a single RAN, but a CD need not be restricted to a RAN, or may be only part of a RAN.

The cache manager 26 is aware of the popularities of all data objects requested at any RBS 22, 23, 24, all possible occurrences in caches 225, 235, 245, and bandwidth limitations in the network, and it is configured to use this information to manage cache updates in accordance with the above. In addition, it is configured to detect and redirect "failed" data requests from users such that requested data objects which cannot be delivered by a cache immediately adjacent to a user may be fetched from other caches in the same CD in preference to the content server 25. In this way the cache manager 26 can provide a (significant) transmission gain from the second hop (between the router 21 and higher layers in FIG. 2) and thus again use links more efficiently. It will be noted that this aspect is particularly attractive where the connections are provided by rented transmission or microwave links In other words, the cache manager 26 increase the "effective" hit rate of the small local caches 225, 235, 245 by distributing content among them during times when there is free bandwidth. The content to be pushed is determined by analyzing data requests from the different caches 225, 235, 245. Content which has been requested on one or more RBSs (and thus cached at the corresponding cache storage units 224, 234, 244) during peak hours will be distributed to the other caches (and thus available for delivery when requested on these RBSs) during off peak hours. In this way some traffic is moved from peak hours (the time when requests are made) to off peak hours (the time when the caches are pre-populated). The content of the different cache storage units 224, 234, 244 will thus diverge during the peak hours (since users at different RBSs 22, 23, 24 request different data objects) and converge during off peak hours (since the caches are equalized by copying content in any cache to all caches).

The cache manager knows where data objects are found and decides what to store on each cache. It is therefore possible that it may decide not to store a data object at all, or to store it but only at some caches but not at others. The choice of which caches to store in may depend on bandwidth, disc space, popularity in general and popularity in certain user groups.

Figure 3:
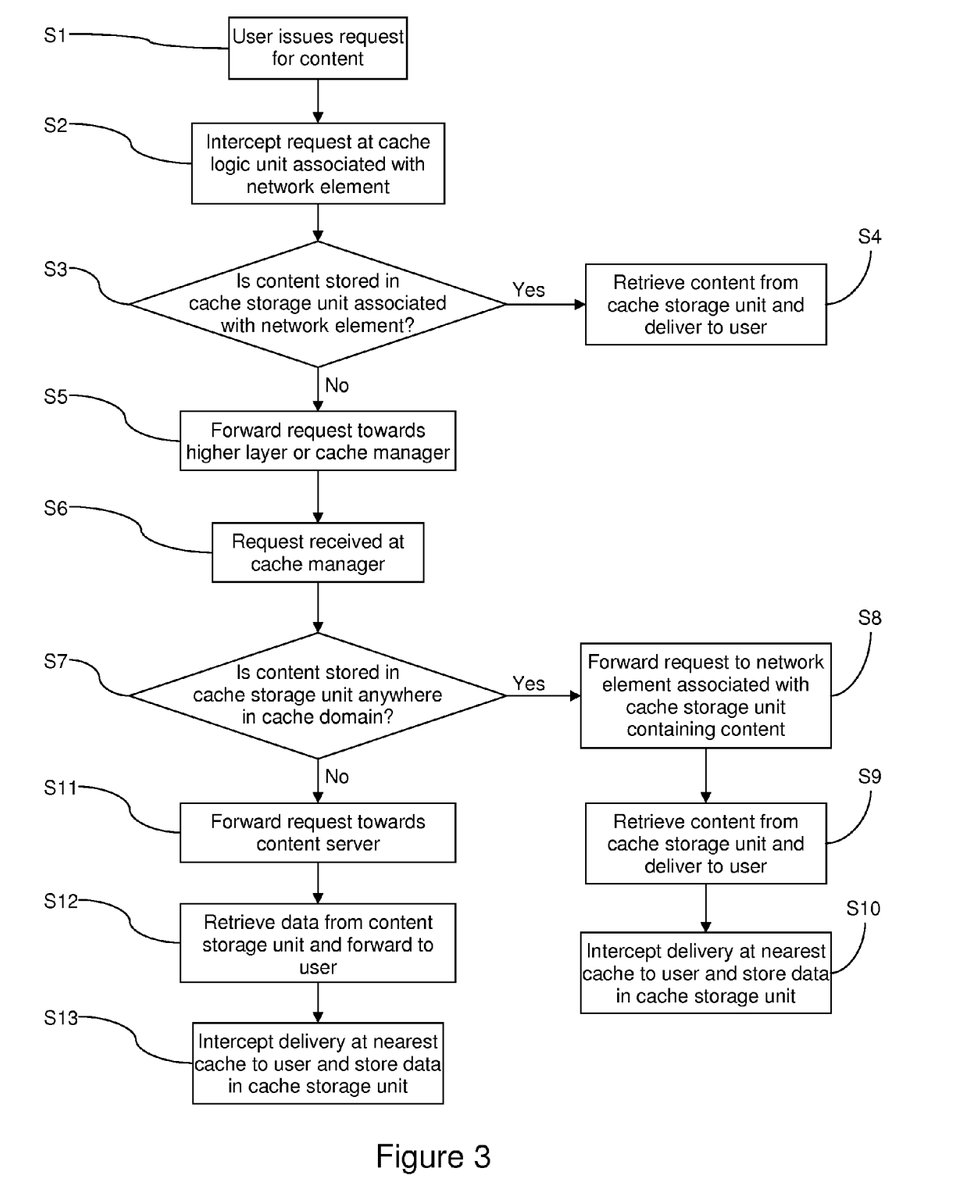
FIG. 3 is a flow diagram illustrating a procedure for serving a user request.

A typical procedure for serving a user request is shown in FIG. 3 and proceeds as follows:

S1 A user of a mobile terminal 222 issues a request (e.g. a HTTP-GET) for piece of content.

S2 The request is intercepted at the site of the RBS 22 (or other network element) by a proxy/DPI logic unit 53 (see FIG. 5) of the cache 225 (which may or may not be built into the RBS 22).

S3 The logic unit 53 interrogates the cache storage unit 224 associated with the RBS 22 to see if the content is stored in that cache storage unit 224

S4 If so, this known as a "primary cache hit": the content is retrieved from the cache storage unit 224 and a local delivery to the terminal 222 takes place. In this case bandwidth savings have been made on all the links in FIG. 2.

S5 If there is a first cache miss, i.e. if the requested content is not available in the cache storage unit 224, the request will be forwarded, either to a "real" content server 25, to a higher layer proxy, or to the cache manager 26.

S6 The request is intercepted (on its path to the content server 25 or a higher layer proxy) or arrives at the cache manager 26 (as the chosen destination).

S7 The cache manager 26 analyses the request and examines if the requested content is found in any other local cache storage unit 234, 244 in the CD.

S8 If so (i.e. there is a secondary cache hit), the request is forwarded to whichever cache 235 contains the content.

S9 The content is retrieved from the cache storage unit 234 and delivered to the user.

S10 The first cache (RBS 22) may intercept the delivery and store the content locally in its associated cache storage unit 224 for future requests. In this case bandwidth savings are made on all links above the router 21 in FIG. 2.

S11 If there is a secondary cache miss (i.e. if the requested content is not available in any of the other cache storage units 234, 244 in the CD), or if dictated by link load conditions towards other local caches, the request for the content is forwarded to the content server 25 or to some higher layer proxy.

S12 The content is delivered to the user from the content server 25 or higher layer proxy.

S13 The first cache (RBS 22) may intercept the delivery and store the content locally in its associated cache storage unit 224 for future requests.

In this way local caches 225, 235, 245 will be filled with content that has been requested by the local users. The content is delivered from different sources; (i) from the local cache itself (if it has been requested by other users of that RBS or site or pushed to that site during off-peak hours, which can be any period of time during which free bandwidth is available), (ii) from another local cache in the CD (if it has recently been requested by another user in the CD), or (iii) from more distant sources (if it has not been requested by any user in the CD). The largest transmission gains are obtained when content is fetched from the local cache, significant gains are obtained when content is fetched from another local cache, and small or no gains are obtained when the content is fetched from a distant source (although caching the data at this stage may lead to gains in the future).

It is thus clear that this process is most efficient if each local cache storage unit 224, 234, 244 is filled with content that has been requested by other users in the entire CD, and which therefore with a high probability will be requested by the local users. If this is the case, primary cache hits (S4) will occur more frequently, reducing the need to carry out steps S7-S13 with their associated use of transmission links and bandwidth. In other words, this increases the fraction of requests for which the highest transmission gains (i) can be obtained.

In order to achieve this, the cache manager 26 collects information about such requests (which predominantly occur during peak hours) and then uses this information to pre-populate caches (predominantly during off peak hours).

For example, when an data object X is requested for the first time in the CD (e.g. by terminal 221), X is fetched from the content server 25 or a higher layer proxy and stored in the cache 225 through with the request is routed. If X is requested soon after by the same terminal 221 or another terminal 222, 223 via the same RBS 22, it is fetched from the cache 225 and delivered to the user. If X is requested soon afterwards via a different RBS 23 in the same CD, it is fetched from the cache storage unit 224 associated with the first RBS 22 and stored also in the cache storage unit 234 of the second RBS 23. Then, at some off peak time, the cache manager 26 ensures that X is distributed to all the caches 225, 235, 245, so that subsequent requests for X are served by the cache at which the request occurred.

Figure 4:
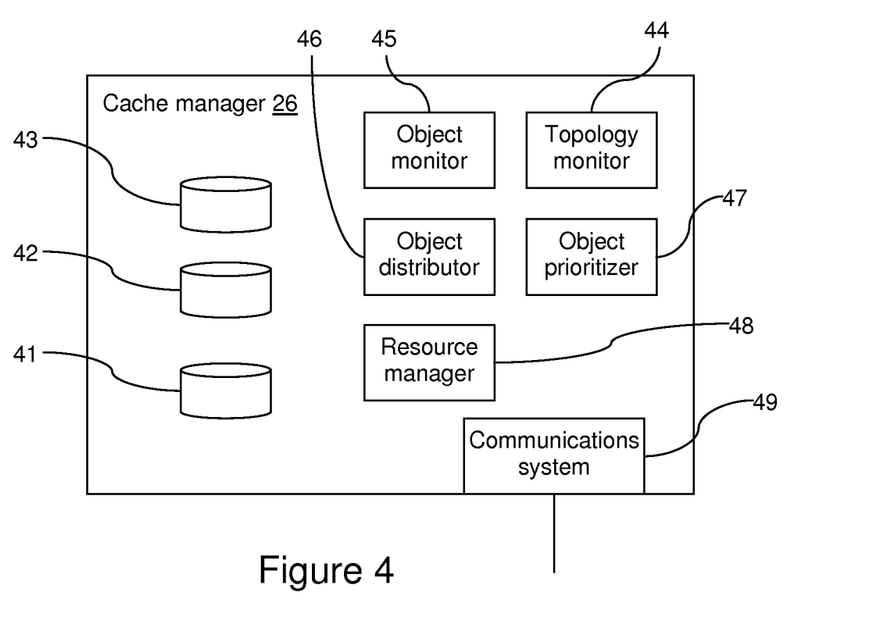
FIG. 4 is a schematic diagram illustrating an information model for a cache manager.

FIG. 4 is a schematic diagram illustrating a suitable information model for the cache manager 26. The manager includes the following information stores:

A topology database 41 which stores information related to:
 Topology structure of CD: (e.g. tree, star, etc.)
 Bandwidth limitations of the links in the topology.
 Location of caches in the topology.
 Current link loads. The topology may support multiple traffic types (e.g. interactive traffic and conversational traffic). The link load monitors the load on the links between network elements to avoid the distribution of data objects causing congestion.
 Transport types: Multicast or unicast.

An object data-base 42 which stores information related to:
 Locations of data objects, i.e. the cache(s), if any, in which different data objects are stored.
 Popularity of data objects including historic information such as previous requests for the data object.
 Cached data objects, i.e. a list of recently cached data objects.

An object distribution status database 43 which includes:
 Object distribution status: this may be a status flag recording the suitability for distribution of data objects: (i.e. "should be distributed", or "should not be distributed") or a parameter with a higher resolution so that distribution can be decided on a cache-by-cache basis.
 Priority: data object distribution priority.
 Wall-clock time: timing information for determining the point at which distribution should start.

The functionality in the manager 26 may be divided into the following blocks:
 Topology monitor 44: a function that retrieves or collects information about the topology of the distributed caches 225, 235, 245.
 Object monitor 45: a function that retrieves or collects information from local caches 22, 23, 24 within the CD about recently cached data objects. The information may be obtained, for example, by regular polling of the caches, by subscribing to information from the caches, or by monitoring and analyzing the traffic between caches and servers. Other possibilities will be apparent to one skilled in the art.
 Object distributor 46: a function that identifies data objects which should be redistributed and performs the redistributions. These actions may be a continuous process or they may take place at a certain frequency, at certain times and/or at certain load conditions.
 Object prioritizer 47: a function that uses popularity statistics, for example, to estimate the probability of multiple requests of an data object in order to prioritize between different data objects which have been identified for redistribution.
 Resource manager 48: a function that ensures that redistributions do not drive the network into overload. This can be achieved, for example, by limiting the number of data objects to be redistributed for a single specific off-peak hour but then continue distribution the next off-peak hours or, when applicable, by selecting from which cache an data object should be delivered.
 Communications system 49: a function that controls communication with other network elements in the CD.

It will be appreciated that the logical elements shown in FIG. 4 all interact with each other to enable the cache manager 26 to perform the functions described.

In addition (and not shown in FIG. 4), there may be a request match maker, the function of which is to redirect requests from caches where a miss occurred to caches where the data object is cached and thus a hit will occur. In this way bandwidth can be saved at substantial bandwidth savings even in the presence of cache equalization delays.

Figure 5:
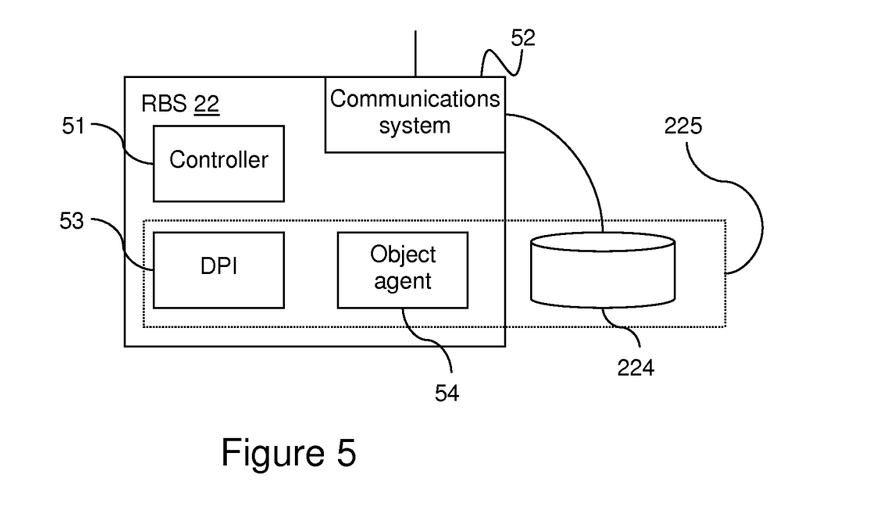
FIG. 5 is a schematic diagram of an RBS configured to act as a cache server.

FIG. 5 is a schematic diagram illustrating the functionality of a RBS 22 and associated cache storage unit 224 acting as a cache 225. It will be appreciated that a cache can be provided at, or associated with, any suitable network element as well as or instead of a RBS, and that functions described as being operated by the RBS 22 may be operated by a separate entity.

The RBS 22 includes a controller 51 and communications system 52 for operating the usual functions of an RBS (e.g. communications with terminals, routers, forwarding traffic etc.). Where the RBS is configured to act as a cache 225 it is also associated with a cache storage unit 224, and includes two further functions; a DPI 53 and an object agent 54, described below.

The functionality in the cache 225 may be described as:
 DPI 53: a function that inspects passing packets to find those packets that include requests for information such as HTTP-GET. It can be implemented as a HTTP-proxy or a Deep Packet Inspection device.
 Cache storage unit 225: a storage space such as a hard-disk. This may be separate from the RBS 22 (as shown in FIG. 5) or an integral part of the RBS 22.
 Object agent 54: an interface towards the cache manager 26 (via the communications system 52 if the cache manager 26 is not part of the RBS 22). The object agent 54 can also distribute information over a TCP/UDP session with low priority such that other traffic (e.g. interactive and conversational) is not disturbed during the transfer. This can be done in two ways: Using a "lower than best-effort" priority class, or a TCP session that backs off faster that usual TCP.

Figure 6:
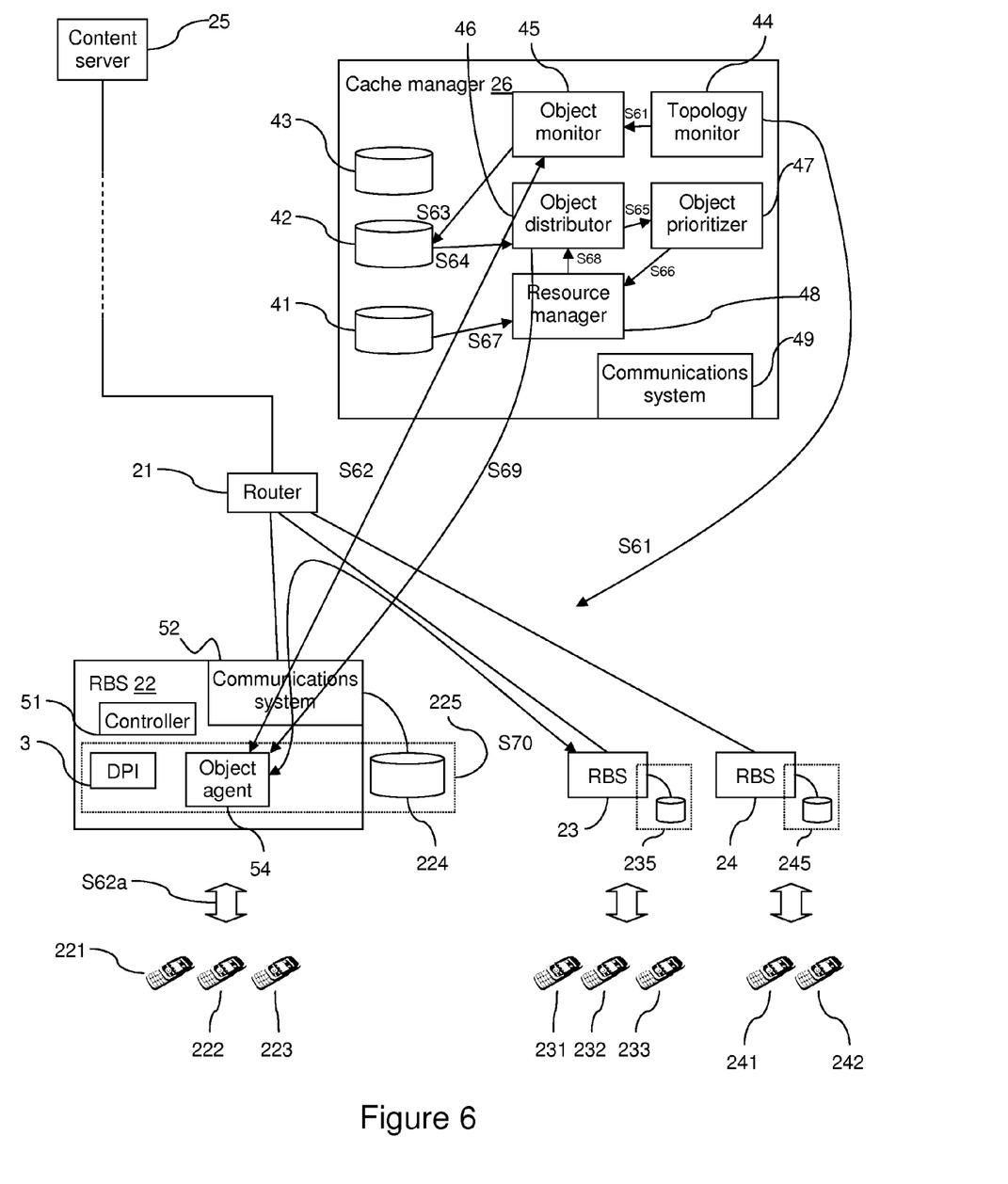
FIG. 6 is a schematic diagram illustrating the management of cached data in the network of FIG. 2.

FIG. 6 is a schematic diagram illustrating one example of how the distribution of cached data can be managed in the network shown in FIG. 2. The information flow is as follows:

S61 The topology monitor 44 monitors the topology of the network elements in the CD, for example using the Simple Network Management Protocol (SNMP), and stores the updated knowledge into the topology database 41.

S62 The object monitor 45 continuously fetches from the local caches 225, 235, 245, via the object agent 54 in those caches or by intercepting content requests, information about data objects recently stored in the caches 225, 235, 245 (for example as a result of a request S62a from a terminal 222).

S63 This information is stored into the object database 42.

S64 At a specific time or at specific load condition, the object distributor 46 inspects the object database 42 for new data objects and compiles a list of new data objects.

S65 The list of new data objects is passed to the object-prioritizer 47. The "object prioritizer" assigns priorities to the data objects and creates a prioritized list of data objects.

S66 The prioritized list is then transferred to the resource manager 48.

S67 The resource manager 48 fetches information from the topology database 41 about the topology status and sets the number of data objects to be transferred based on the topology information.

S68 A new list is then transferred back to the object distributor 46.

S69 Based on the processed list, the object distributor 46 creates a set of object distribution requests which are sent to the object agent 54 in one or more of the caches 225. Several requests can be sent which may be distributed over longer periods of time. The requests can include information about the source (a local cache at which the data object is found), the sink(s) (the local caches at which the data object should be stored) and about distribution method (unicast, multicast).

S70 The object agent 54 initiates transfers after receiving such requests. Such transfers may be implemented in many ways. As a first, straightforward example, the object distributor 46 at the manager may instruct object agents at destination caches to issue ordinary request message (i.e. HTTP-GET messages) and to ensure that these requests be sent to the object agents of the source local caches. As a second, more advanced, example the object distributor 46 at the manager may instruct object agents at source caches to set up broadcasts and instruct object agents at specified sets of destination caches to listen to these broadcasts.

The sequence above is an example of updates in a distributed caching architecture. As a complementary example, some of the functionally provided by the object monitor 45, object distributor 46, object prioritizer 47 and resource manager 49 may be implemented as one or more object transfer queues (OTQs).

OTQs contain data objects (or references to data objects) which are to be updated at one or more caches. The requests are served according to a priority based discipline where the most urgent updates are served first.

An data object in an OTQ may be an update including a pointer to a source (e.g. cache 225) and one or more pointers to receivers (e.g. caches 235, 245). One can envisage a single, global OTQ; one OTQ for fetching data objects from sources and another OTQ for dispatching data objects to receivers; or, optionally, a "fetch-OTQ" and a "dispatch-OTQ" for each local cache. It will be noted that separate queues are a logical notation rather than a physical implementation.

The object monitor 45 and object prioritizer 47 may be responsible for adding elements to the OTQs as new or updated data objects are observed. Queued entries may be replaced or preceded by other entries as more recent updates or more popular data objects are observed.

The resource manager 48 may supervise the traffic from each cache and activate the first entry in the fetch-OTQ of the corresponding cache when the traffic is below a certain threshold. Similarly, it may supervise the traffic to each cache and activate the first entry in the dispatch-OTQ of the corresponding cache when the traffic is below a certain threshold. Data objects which have been fetched but not yet dispatched would in the meantime be stored by the manager itself. This "global stand-by scheduling" should use all available bandwidth in order to minimise the transfer times and thus maximise the hit rates at the local caches.

As noted above, the term "stand-by" is related to the fact that requests are served as free capacity (which may be identified, for example, in terms of link load) is detected. The meaning may, however, be expanded and not only refer to requests but to single packets. This can be accomplished either by traffic differentiation in MPLS, in the link scheduling at the two end points or by means of a "soft" end-to-end protocol which yields to congestion much faster and stronger than other traffics (i.e., a protocol which is more responsive than TCP).

It will be appreciated that there is a sense in which all local caches 225, 235, 245 have agents, that is to say "slave agents" which listen to and obey a "master", i.e. the cache manager 26. A distributed implementation of the cache manager may extend these local slave agents or implement new local managers as "master agents".

Furthermore, it will be appreciated that slightly different modes of communication between RBSs 22, 23, 24 and cache manager 26 are possible. For example, consider two cases, a primary cache hit and a primary cache miss (as in steps S4 and S5 of FIG. 3), in a local cache at RBS 22.

If there is a hit (i.e. content is requested which is present in the cache storage unit 224), the RBS 22 may or may not inform the cache manager 26 of the request due to size or security reasons. Some data objects may contain viruses or that the portal is not trusted. This can be described by local policy-rules in the cache. Informing the manager may help the manager to improve its plans for placing content at other caches (more popular content should perhaps be shared to other caches sooner) and, in particular, to improve its suggestions for identifying data objects which can be deleted when caches are full (less popular content should go first when a cache is full and the "global" view of the cache manager may help in identifying these data objects in a statistically accurate way).

If there as a miss (i.e. the requested content is not present in the cache storage unit 224) the requesting local cache could fetch the content from somewhere else (typically a higher layer cache or the content server 25) and then inform the cache manager 26 about its new acquisition. Alternatively, prior to the request it could ask the cache manager 26 where the content should be fetched from, and the cache manager 26 can direct the RBS 22 to another local cache. In a further alternative, all requests could be handled through the cache manager 26 so that the requesting, local cache is unaware of the source of the content.

The arrangements described above enable a distributed caching architecture to perform a similar function to a large cache, even where resources are limited. High caching hit-rates can be provided independently of where in the topology the cache is located.

The updates of the caches can be performed without disturbing other traffic, e.g. during non-busy hours, to ensure that the distribution does not require more capacity in the transport network.

The effectiveness of this approach can be illustrated by simulation of two scenarios.

The first scenario was designed to resemble video on demand, and assumes a system with 16,000 data objects (movies) where content servers operate on the level of 100 RBSs each of which receives about 100 requests per day (hence the server is exposed to a total of 10,000 requests per day). Each day 16 new data objects (movies) are added. The request rate of the different data objects follows a Zipf-Mandelbrot distribution such that the request rate of the r:th most popular data object is proportional to $(r+q)^{-\beta}$ with $\beta=0.75$ and $q=80$.

In this example, the intention was to compare three different cases, ignoring possible memory limitations. In the first case a central cache was placed at a content server which also acts as a cache manager (hence its caching gain is determined by the request rates of all RBSs); in the second case distributed caches were placed at the RBSs and updated once per day (it will be noted that this is a relatively pessimistic assumption about updates); and in the third case distributed caches were placed at the RBSs, but without controlled updates.

Figure 7:
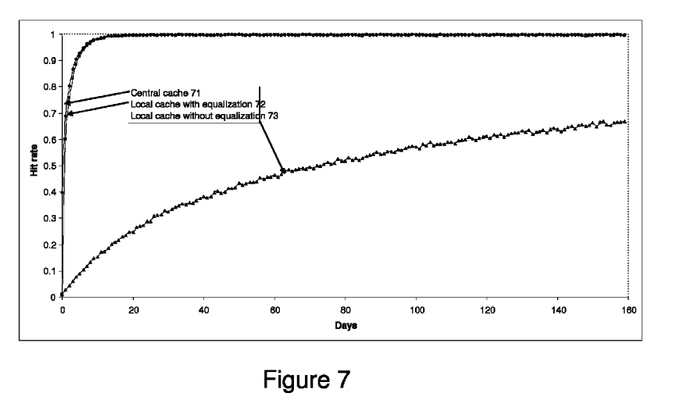
FIG. 7 is a schematic diagram illustrating the results of the simulation.

The results of the simulation of this scenario are illustrated in FIG. 7, which shows the variation of hit rate over time for the three cases 71, 72, 73. It was found that the hit rate in the second case 72 was almost the same as the first case 71, but was much lower in the third case 73. In other words the hit rate at the distributed caches is almost the same as that of a central cache if updates are used, but much lower when updates are not used.

The second scenario was designed to resemble web data objects, and assumes a system with 1,600,000 data objects (pages etc.) where managers operate on the level of 100 RBSs each of which receives about 10,000 requests per day (so the manager is exposed to a total of 1,000,000 requests per day). Each day 16,000 new data objects (pages etc.) are added and 32,000 data objects (pages etc.) are updated. The request rate of the different data objects follows a Zipf-Mandelbrot distribution such that the request rate of the r:th most popular data object is proportional to $(r+q)^{-\beta}$ with $\beta=1.00$ and $q=0$ while the ranks of data objects to be inserted or updated are drawn from a similar distribution with $\beta=0.25$ and $q=0$.

Figure 8:
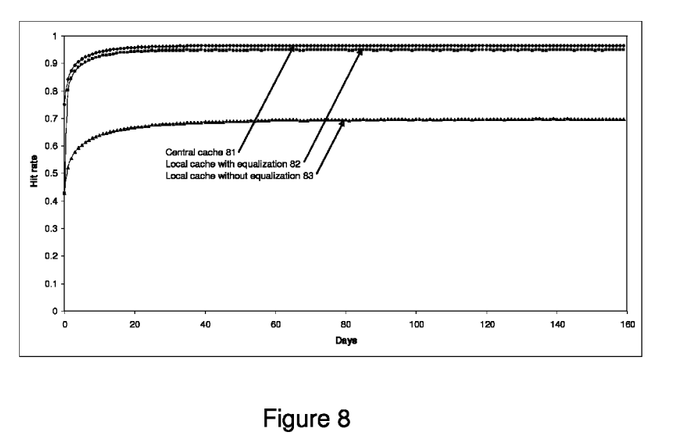
FIG. 8 is a schematic diagram illustrating the results of the comparison.

Again the intention is to compare different cases and so possible memory limitations are again ignored. The same three cases as above are compared, and the results are shown in FIG. 8: in the first case 81 a central cache is placed at a control server which also operates as a cache manager (hence its caching gain is determined by the request rates of all RBSs); in the second case 82 distributed caches are placed at the RBSs and updated once per day; and in the third case 83 distributed caches are again placed at the RBSs but this time without controlled updates.

Again, it was found that the hit rate of distributed caches is almost the same as that of a central cache if updates are used, but much lower if updates are not used.

The invention claimed is:

1. A network element configured to act as a cache for sending cached data in a session to a mobile terminal in a packet data network, the network element being associated with a cache storage unit for storing data objects, the network element comprising:
    a communications system for communication with other elements in the network;
    a DPI or proxy agent configured to inspect packets from the terminal passing through the network element to determine if they include a request for a data object, determine whether the requested data object is stored in the cache storage unit and, if so, send the requested data object towards the terminal; and
    an object agent configured to receive instructions from a cache manager controlling caches in a cache domain of the network, and in response to send data objects to other caches in the cache domain using transmission capacity that would otherwise remain unused.

2. The network element of claim 1, wherein the object agent is further configured to receive data objects not requested by the mobile terminal from other caches in the cache domain, and to store the received data objects in the cache storage unit.

3. The network element of claim 1, wherein the DPI or proxy agent is configured so that, if the requested data object is not stored in the cache storage unit, the request is passed towards an upstream network element or the cache manager and, when the requested data object passes through the network element when it is returned towards the terminal, it is saved in the cache storage unit.

4. The network element of claim 1, wherein the network element is a Radio Base Station.

5. The network element of claim 1, wherein the object agent is configured to use transmission capacity that would otherwise remain unused by sending data objects to other caches during off-peak data traffic periods.

6. The network element of claim 5, wherein the data objects sent to the other caches during off-peak data traffic periods are not high priority data objects, and are sent in response to instructions from the cache manager.

7. The network element of claim 1, wherein the object is further configured to send high priority data objects to other caches in the cache domain during peak periods in response to instructions from the cache manager.

8. The network element of claim 6, wherein high priority data objects are those requested by another mobile terminal through another cache.

9. The network element of claim 1, wherein the object agent is configured to capture each event of a request for a particular data object, and pass this information to the cache manager to assist in identifying which data objects should be distributed between caches.

10. The network element of claim 1, wherein the cache storage unit is included in the network element.

11. A cache manager for controlling the distribution of content stored in caches in a cache domain in a packet data network, the cache manager comprising:
    an object monitor for receiving notifications from caches in the cache domain about data objects requested at those caches;
    an object database for collating and storing object information about the requested data objects, the object information including information about the caches at which the data objects have been requested and frequency with which the requests have been made; and
    an object distributor for identifying objects for distribution on the basis of the object information and instructing the caches in the cache domain to distribute data objects stored in those caches between themselves using transmission capacity of the network that would otherwise be unused.

12. The cache manager of claim 11, wherein the cache manager is a discrete entity and includes a communications system for communicating with elements in the network.

13. The cache manager of claim 12, wherein the cache manager is associated with one of the caches in the cache domain.

14. The cache manager of claim 11, wherein the functionality of the cache manager is distributed among network elements in the cache domain.

15. The cache manager of claim 9, further comprising:
    a topology monitor for retrieving topology information about the topology of the cache domain; and
    a topology database for storing said topology information;
    wherein the object distributor is configured to make use of the topology information in the determination of how the objects should be distributed between the caches.

16. The cache manager of claim 15, wherein the topology information includes data relating to one or more of:
    a topology structure of the cache domain;
    bandwidth limitations of links between elements in the topology structure;
    location of caches in the topology structure;
    current loads sustained by the links between elements in the topology structure; and
    transport types for data within the cache domain.

17. The cache manager of claim 11, further configured to control the distribution of the data objects between caches in the cache domain so that the cache domain functions as a large virtual cache.

18. The cache manager of claim 11, wherein the network is a mobile network,

19. The cache manager of claim 18, wherein the cache domain corresponds to a radio access network in the mobile network.

20. The cache manager of claim 11, wherein the object distributor is configured to instruct the caches in the cache domain to distribute high priority objects between themselves during peak periods.

21. A method for optimising the distribution of data objects between caches in a cache domain of a resource limited network, the method comprising:
   receiving user requests for data objects at caches in the cache domain;
   sending a notification from the cache at which a request is received to a cache manager reporting the user request and identifying the requested data object;
   at the cache manager, collating and storing object information including the request frequency of each requested data object and the locations of the caches at which the requests were received;
   at the cache manager, identifying objects for distribution within he cache domain on the basis of the object information;
   sending instructions from the cache manager to the caches to distribute data objects stored in those caches between themselves; and
   distributing the data objects between the caches using transmission capacity of the network that would otherwise be unused.

22. The method of claim 21, wherein functionality of the cache manager is distributed between network elements in the cache domain, 23. The method of claim 21, wherein the cache manager further takes into account one or more of the topology of the network, the priority of the requested data objects, and the frequency of requests for particular data objects when identifying the data objects for distribution.

24. The method of claim 21, wherein the network is a mobile network.

25. The method of claim 24, wherein the caches are associated with or part of Radio Base Stations, 26. The method of claim 21, wherein the data objects are distributed between the caches during off-peak periods.

27. The method of claims 21, further comprising:
   labelling a data object as a high priority data object if it is not stored in the cache at which the user request for that data objects is received; and
   sending instructions, from the cache manager to a cache at which the high priority data object is stored, to send the high priority data object to the cache at which the user request was received during a peak period.

28. A non transitory computer program product comprising code adapted to be executed on a network element associated with a cache storage unit in a resource limited network, the code operable to cause the network element to:
   inspect packets, from terminal in the network, passing through the network element;
   determine if said packets include a request for a data object;
   determine whether the requested data object is stored in the cache storage unit and, if so, send the requested object towards the terminal;
   receive instructions from a cache manager controlling caches in a cache domain of the network to send data objects to other caches in the cache domain using transmission capacity that would otherwise remain unused; and
   send the data objects in accordance with the received instructions.

29. A non-transitory computer program product comprising code adapted to be executed on a cache manager in a resource limited network, the code operable to cause the cache manager to:
   retrieve notifications from caches in a cache domain controlled by the cache manager, the notifications including details of data objects recently requested at those caches;
   collate and store object information about the requested data objects, the object information including the location and popularity of requested data objects;
   identify objects for distribution on the basis of the object information; and
   instruct the caches in the network to distribute data objects stored in those caches between themselves using transmission capacity of the network that would otherwise be unused.

* * * * *

UNITED STATES PATENT AND TRADEMARK OFFICE
CERTIFICATE OF CORRECTION

PATENT NO. : 8,880,636 B2
APPLICATION NO. : 13/637344
DATED : November 4, 2014
INVENTOR(S) : Westberg et al.

It is certified that error appears in the above-identified patent and that said Letters Patent is hereby corrected as shown below:

In the Specification

In Column 5, Line 2, delete "server; and" and insert -- server; --, therefor.

In Column 5, Line 4, delete "FIG. 2." and insert -- FIG. 2; --, therefor.

In Column 5, Line 6, delete "simulation." and insert -- simulation; and --, therefor.

In Column 10, Line 45, delete "that" and insert -- than --, therefor.

In the Claims

In Column 14, Line 11, in Claim 7, delete "object is" and insert -- object agent is --, therefor.

In Column 14, Line 52, in Claim 15, delete "claim 9," and insert -- claim 11, --, therefor.

In Column 15, Line 6, in Claim 18, delete "network," and insert -- network. --, therefor.

In Column 15, Line 27, in Claim 21, delete "within he" and insert -- within the --, therefor.

In Column 15, Line 37, in Claim 22, delete "domain," and insert -- domain. --, therefor.

In Column 15, Line 43, in Claim 24, delete "c1aim" and insert -- claim --, therefor.

In Column 15, Line 46, in Claim 25, delete "Stations," and insert -- Stations. --, therefor.

Signed and Sealed this
Eighth Day of September, 2015

Michelle K. Lee
*Director of the United States Patent and Trademark Office*

In Column 16, Line 3, in Claim 27, delete "claims 21," and insert -- claim 21, --, therefor.

In Column 16, Line 16, in Claim 28, delete "from terminal" and insert -- from a terminal --, therefor.